(12) United States Patent  
Lin et al.

(10) Patent No.: US 7,317,832 B2  
(45) Date of Patent: Jan. 8, 2008

(54) METHOD OF PHOTO/TEXT SEPARATION USING PATH FREQUENCY OF PIXEL INTENSITIES

(75) Inventors: Che-Sheng Lin, Taipei (TW); Ching Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 783 days.

(21) Appl. No.: 10/839,171

(22) Filed: May 6, 2004

(65) Prior Publication Data

US 2005/0249413 A1   Nov. 10, 2005

(51) Int. Cl.  
*G06K 9/34* (2006.01)

(52) U.S. Cl. .................................... 382/176

(58) Field of Classification Search .............. 382/171, 382/173, 174, 176, 199; 358/453, 462, 465  
See application file for complete search history.

(56) References Cited

U.S. PATENT DOCUMENTS

| | | | | |
|---|---|---|---|---|
| 4,578,712 A | * | 3/1986 | Matsunawa | 358/464 |
| 4,910,786 A | * | 3/1990 | Eichel | 382/199 |
| 5,767,978 A | * | 6/1998 | Revankar et al. | 358/296 |
| 6,744,918 B1 | * | 6/2004 | Caldato et al. | 382/164 |
| 6,917,707 B1 | * | 7/2005 | Kubota | 382/176 |
| 7,043,080 B1 | * | 5/2006 | Dolan | 382/199 |

* cited by examiner

*Primary Examiner*—Jose L. Couso  
(74) *Attorney, Agent, or Firm*—Rabin & Berdo, P.C.

(57) ABSTRACT

A method of photo/text separation using path frequency of pixel intensities is disclosed. It divides an original image into n*n pixel blocks and records the path conditions satisfied by the intensities of consecutive two pixels. From the statistical analysis of the path appearance frequency, the method determines the text/photo types in the pixel block, thereby determining the output type of the whole original image.

11 Claims, 4 Drawing Sheets

METHOD OF PHOTO/TEXT SEPARATION USING PATH FREQUENCY OF PIXEL INTENSITIES

BACKGROUND OF THE INVENTION

1. Field of Invention

The invention relates to a method for determining image output types and, in particular, to a method for determining image output types that uses the analysis of path conditions satisfied by each consecutive two pixels in the image to perform photo/text separation.

2. Related Art

Image outputs usually include photo, text, and photo-text mixed cases. Including the possibility of black-and-white (BW) and color image, the image output combinations become rather complicated. In order for an image output device (such as inkjet printers and laser printers) to have good output speed and quality, performing efficient photo/text separation is a key technique.

To achieve this goal, the image output device often executes a so-called photo/text separation procedure before actual output. The main purpose of this step is to output the photo and text parts of the image in different methods, so that both the photo and text parts can have the optimized image output quality. Of course, saving the ink is also another advantage of the photo/text separation procedure.

The main difference between the photo and text image output is whether the halftone process is involved. Since photos have non-continuous tones, it is more suitable to be processed using the halftone process. On the other hand, the text has a continuous tone and therefore is not suitable for the halftone process. If no photo/text separation procedure is done before the image output, both of them are processed and output through the halftone process. This greatly affects the quality of the output images. Moreover, using the halftone process for the text part wastes a lot of printing materials.

Therefore, executing a photo/text separation procedure before image output is necessary. There are many photo/text separation techniques introduced in the prior art. Their main technical means is to perform statistical analyses in individual characteristic values of all the pixels in the original image. They totally ignore the existence of possible correlation between consecutive pixels. Therefore, it is likely to have larger errors in the photo/text separation.

Moreover, the photo/text separation performed by the conventional methods often has to perform an operation, determination, recording, and statistical analysis for each of the pixels. Thus, their efficiency is not satisfactory. In particular, if the original image is larger in size, computing for each pixel will affect the overall operation efficiency. This is another drawback of the prior art.

Consequently, it is imperative to provide a new method that is not likely to make errors in the photo/text separation while at the same time can have better operation efficiency.

SUMMARY OF THE INVENTION

To solve the problems existing in the prior art, the invention provides a method that uses the path frequency of pixel intensities to perform photo/text separation.

The invention improves the problem of large errors and low efficiency in the prior art as a result of performing an operation, determination, recording, and statistical analysis for each pixel in an image.

The technical means of the invention is to first divide an original image into n*n pixel blocks. It records the path conditions satisfied by the pixel intensities of each consecutive two pixels in the pixel block. From the statistical analysis of path appearance frequency, the method determines the photos and text existing in the pixel block, thereby determinig the output type of the whole original image.

The invention can indeed achieve the primary goals of photo/text separation in an original image and of increasing the image output efficiency and quality. In comparison with the prior art, the invention takes into account the correlation between consecutive pixels. Therefore, it can reduce the errors in photo/text separation. Since nothing is done when consecutive pixels have the same path condition, the method can achieve higher operation efficiency.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The invention uses the analysis of path conditions satisfied by the pixel intensities of each consecutive two pixels in the image to perform photo/text separation. The disclosed method can be implemented on hardware.

The photo/text types in a normal image include: (1) BW text, (2) BW photo, (3) color photo, (2) BW text/color photo, and (5) color text/color photo.

Distinguishing these pixels according to their intensity ranges, we have the following threshold: (1) a white pixel intensity threshold (TH_White), (2) a color pixel high intensity threshold (TH_Color_High), (3) a color pixel low intensity threshold (TH_Color_Low), and (4) a black pixel intensity threshold (TH_Black).

When dividing an image into individual pixel blocks to measure the intensity range of each pixel, one finds that the intensity ranges of consecutive pixels also satisfy either (1) white-to-color path condition (W_C_Path), (2) white-to-black path condition (W_B_Path), or (3) color-to-black path condition (C_B_Path).

Figure 3A:
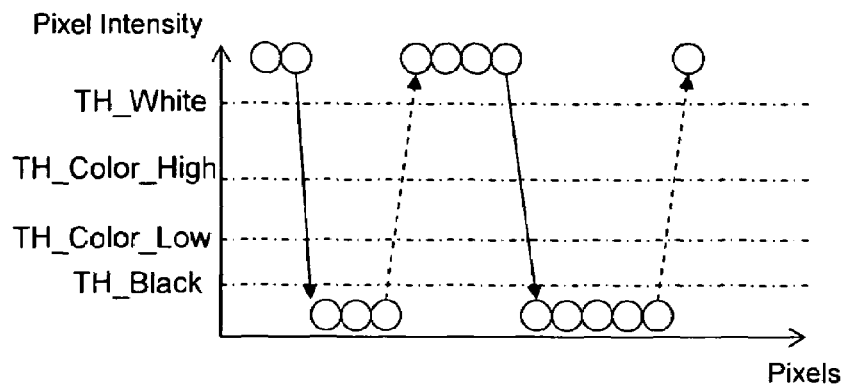
FIGS. 3A to 3E are schematic view of the paths in different photo/text types.

Since for images with different photo/text types, the frequency of satisfied path conditions has certain rules, this frequency can be used as the basis for determining the output type. Basically, the frequency of the above five photo/text types satisfying their path conditions can be summarized as follows:

(1) BW text: Its W_C_Path frequency is closed to ($\approx$) the W_B_Path frequency. Its appearance frequency is relatively lower than a predetremined frequency threshold, which can be set according to practical needs. (see FIG. 3A).

Figure 3B:
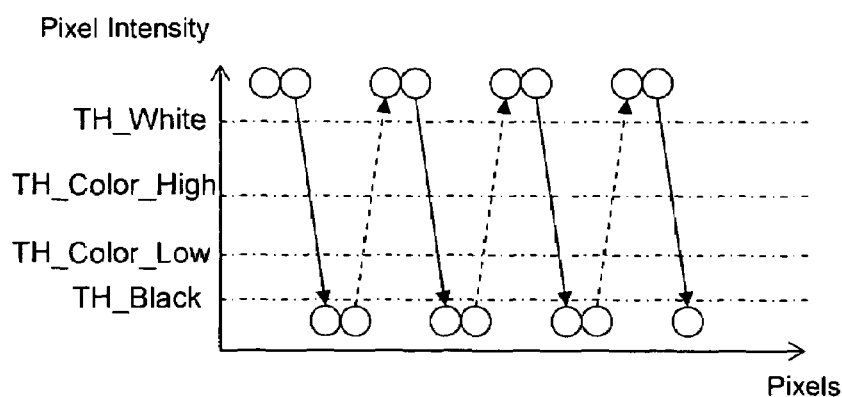

(2) BW photo: Its W_C_Path frequency is close to the W_B_Path frequency. But its appearance frequency is relatively higher than the predetremined frequency threshold. (see FIG. 3B)

Figure 3C:
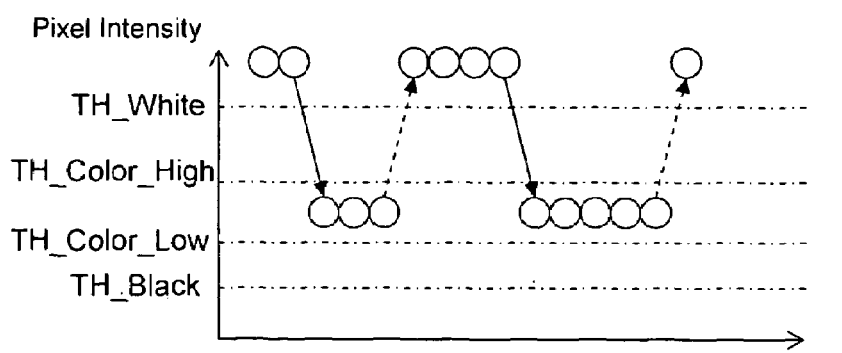

(3) Color photo: Its W_C_Path frequency is greater than (>) the W_B_Path frequency. The W_C_Path appearance frequency is relatively higher than the predetermined frequency threshold, while its W_B_Path appearance frequency is relatively low (close to 0). (see FIG. 3C).

Figure 3D:
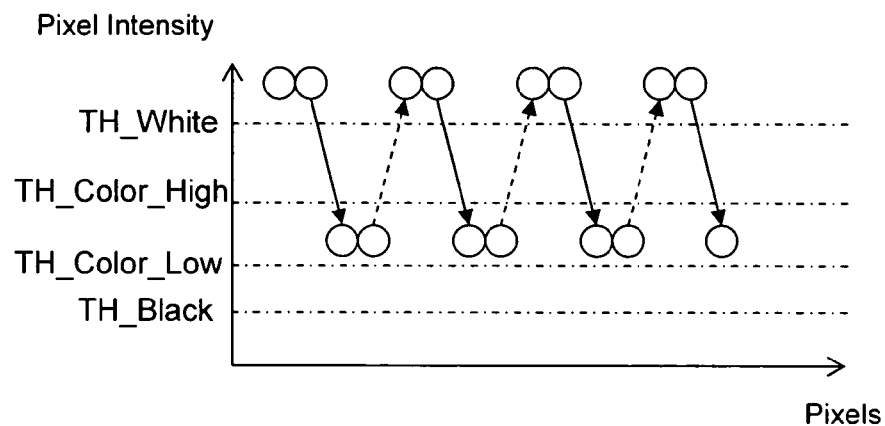

(4) BW text/color photo: Its W_C_Path frequency is greater than the W_B_Path frequency. Its W_C_Path appearance frequency is relatively higher than the predetremined frequency threshold, while its W_B_Path appearance frequency is relatively lower than the predetermined frequency threshold (but not close to 0). (see FIG. 3D)

Figure 3E:
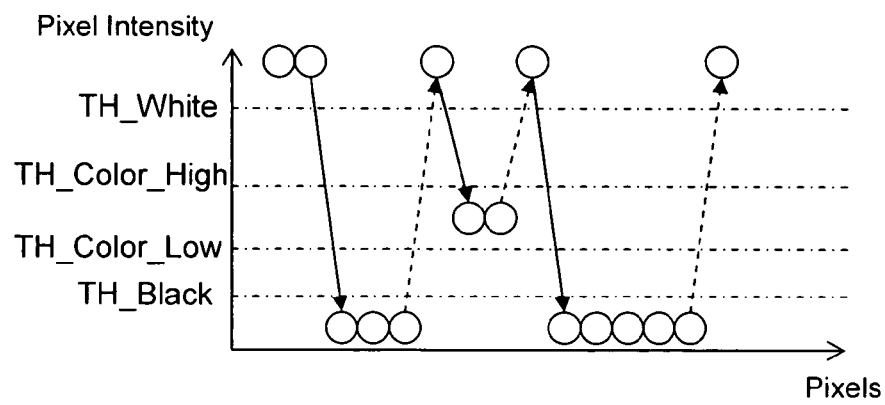

(5) Color text/color photo: Its W_C_Path frequency is greater than the W_B_Path frequency. Its W_C_Path appearance frequency is relatively lower than the predetremined frequency threshold, and its W_B_Path appearance frequency is relatively lower than the predetermined frequency threshold (close to 0). (see FIG. 3E)

Figure 1:
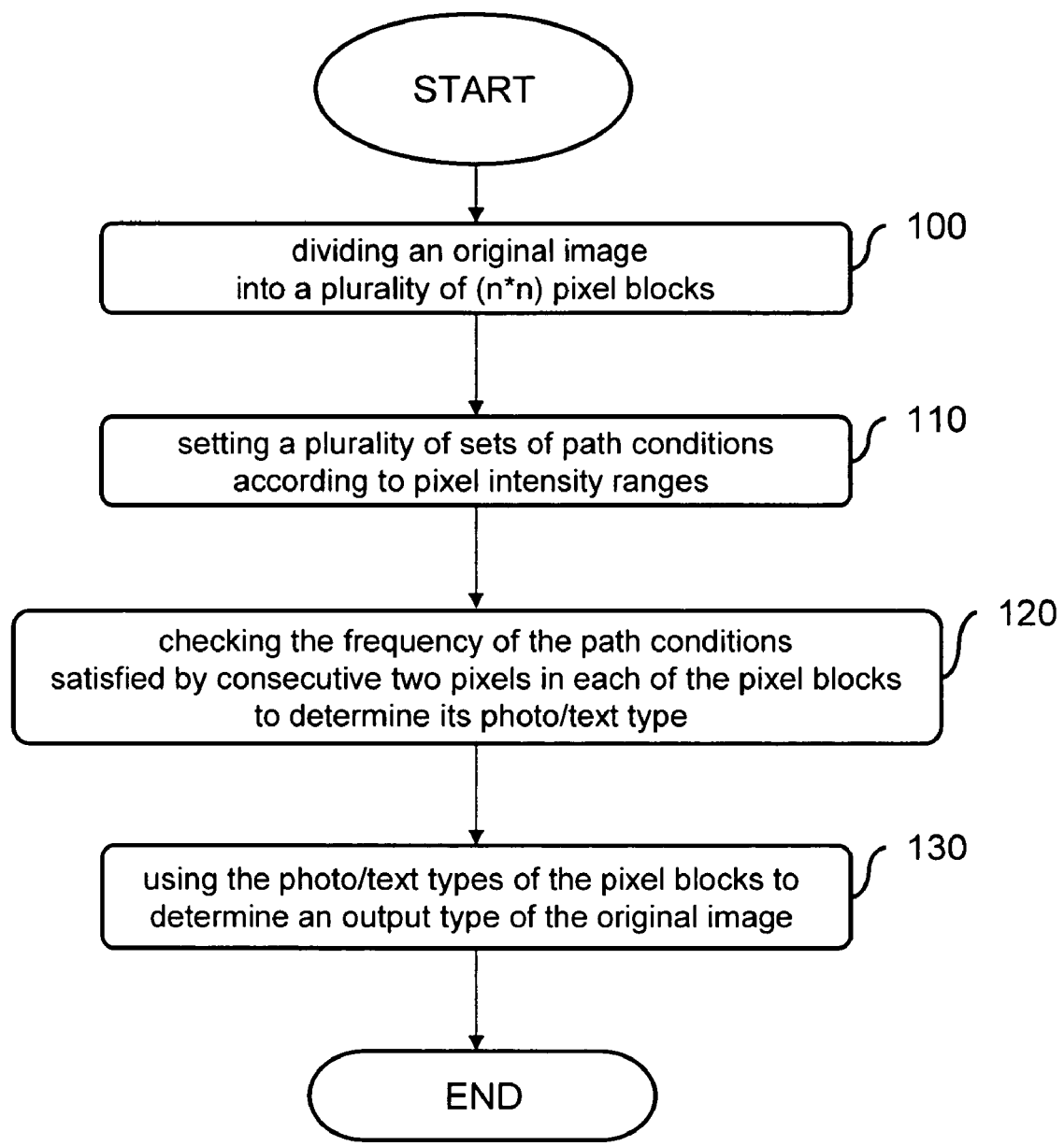
FIG. 1 is a flowchart of the disclosed method.

The disclosed method makes use of the above-mentioned principle to perform a statistical analysis for the appearance frequency of the path conditions satisfied by the pixel intensities of consecutive two pixels, thereby determining whether the output type should be halftone or non-halftone. The procedure of the method is further described in the following with simultaneous reference to FIG. 1.

To determine the intensity of each pixel in the original image, the original image is first divided into n*n pixel blocks (step 100). The actual size of the pixel blocks can be determined according to the hardware conditions and practical needs. The common divisions include 8*8, 16*16, 32*32, and 64*64 pixel blocks, but the invention is not limited by these choices. According to the pixel intensity ranges, such as TH_White, TH_Color_High, TH_Color_Low, and TH_Black, possible path conditions for freqency statistical analyses are entered. These include white-to-color path condition (W_C_Path), white-to-black path condition (W_B_Path), and color-to-black path condition (C_B_Path) (step 110). Afterwards, the pixels in each pixel block are scanned to find the frequencies of path conditions satisfied by consecutive two pixels in the pixel block. This frequency statistical result is used to determine the photo/text type of the pixel block (step 120). The photo/text types include: BW text, BW photo, color photo, BW text/color photo, and color text/color photo. The determination criteria (including the frequency threshold) have to be set in advance for figuring out the photo/text types later on. Finally, the photo/text types of all the pixel blocks in the original image are analyzed to determine the output type of the image (step 130). The output type can be determined by comparison with the predetermine type threshold. This completes the procedure of photo/text separation using the pixel intensity path frequencies.

Figure 2:
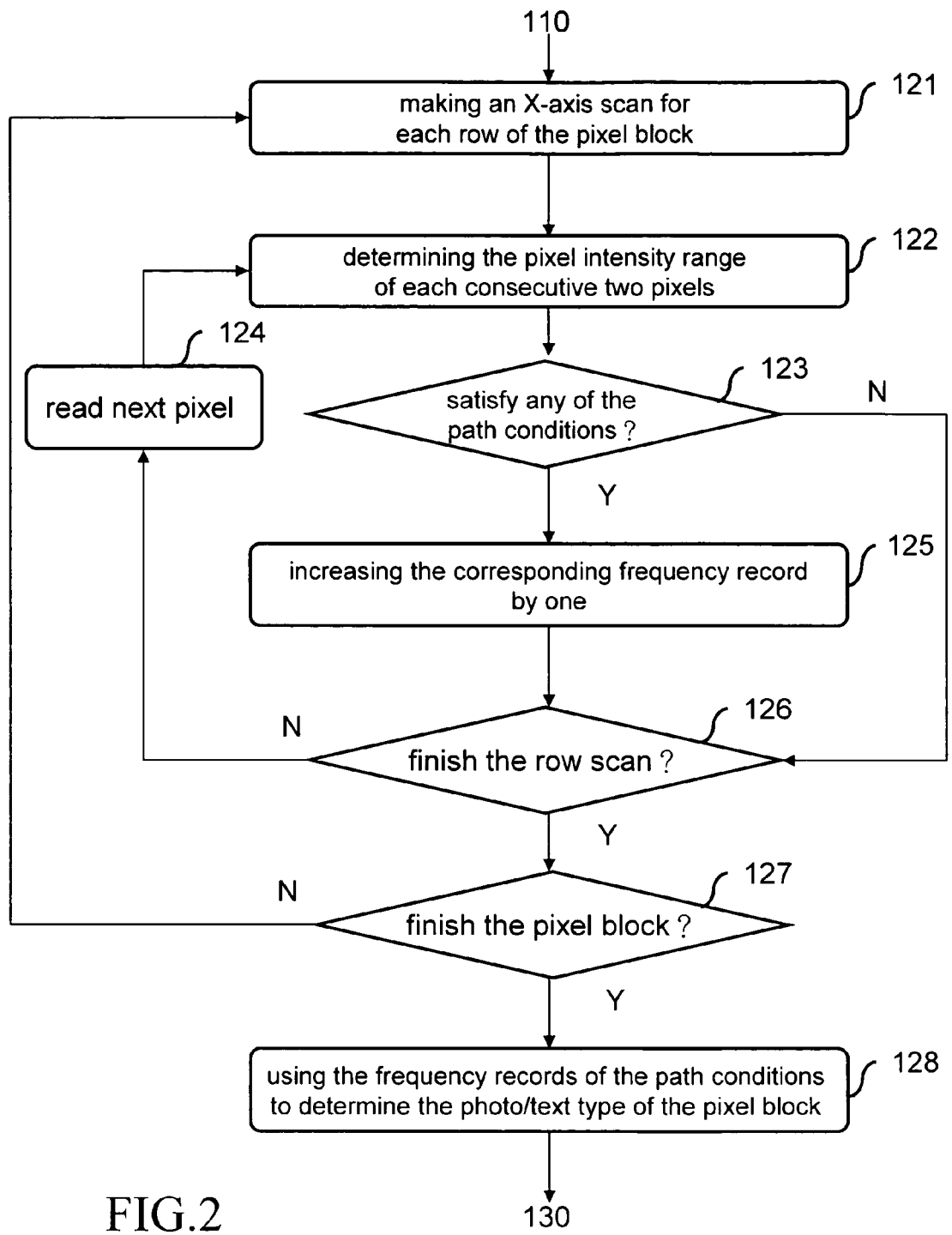
FIG. 2 is a flowchart of determining the photo/text type of a pixel block.

The detailed procedure in step 120 is described below with simultaneous reference to FIG. 2.

After step 110, step 120 of the method determines the photo/text type for each pixel block. First, it performs scans in the X direction (row scan) in a pixel block (step 121). The method determines the pixel intensity range of consecutive two pixels (step 122), checks whether the pixel intensity range of consecutive two pixels satisfies the predetermined path condition (step 123). If it is not satisfied, the procedure enters step 126 to determine whether to finish the row scan. If not, the next pixel is read in (step 124) for further determination. If the path condition is satisfied, the corresponding frequency is increased (step 125). If the row scan is not finished (step 126), the procedure goes back to step 124 and read in the next pixel (step 124) for further determination.

Once a row (X-direction) scan and determination are done (step 126), the method checks whether the scan of the whole pixel block is done (step 127). If not, the procedure returns to step 121 for scanning the next row. Otherwise, the frequency records of all path conditions and the predetremined frequency threshold are used to determine the photo/text type of this pixel block (step 128). After finishing the type determination of all the pixel blocks in the original image, the method enters step 130.

The above-mentioned frequency threshold and the type threshold can be arbitrarily defined by the user according to practical needs. Therefore, the invention does not impose any constraint in this regard.

The original image mentioned herein can be a monochromatic image or color image. In the above preferred embodiment, we use a color image as an example. One can apply the same method to monochromatic images by removing from the steps the parts that involve color.

Certain variations would be apparent to those skilled in the art, which variations are considered within the spirit and scope of the claimed invention.

What is claimed is:

1. A method for photo/text separation using path frequencies of pixel intensities, comprising the steps of:
   dividing an original image into a plurality of (n*n) pixel blocks;
   setting a plurality of sets of path conditions according to pixel intensity ranges;
   checking the frequency of the path conditions satisfied by consecutive two pixels in each of the pixel blocks to determine its photo/text type; and
   using the photo/text types of the pixel blocks to determine an output type of the original image.

2. The method of claim 1, wherein the original image is a monochromatic image.

3. The method of claim 1, wherein the original image is a color image.

4. The method of claim 1, wherein n is selected from the set consisting of 8, 16, 32, and 64.

5. The method of claim 1, wherein the pixel intensity ranges include at least a white pixel intensity threshold, a color pixel high intensity threshold, a white pixel low intensity threshold, and a black pixel intensity threshold.

6. The method of claim 1, wherein the path conditions include at least a white-to-color path condition, a white-to-black path condition, and a color-to-black path condition.

7. The method of claim 1, wherein the step of checking the frequency of the path conditions satisfied by consecutive two pixels in each of the pixel blocks to determine its photo/text type include the steps of:
   making an X-axis scan for each row of the pixel block;
   determining the pixel intensity range of each consecutive two pixels;
   when any of the path conditions is satisfied, increasing the corresponding frequency record by one; and
   using the frequency records of the path conditions to determine the photo/text type of the pixel block.

8. The method of claim 7, wherein the step of using the frequency records of the path conditions to determine the photo/text type of the pixel block further includes the step of setting a frequency threshold to determine the photo/text type of the pixel block.

9. The method of claim 7, wherein the photo/text type is selected from the group consisting of a black-and-white (BW) text type, a BW photo type, a color photo type, a BW text/color photo type, and a color text/color photo type.

10. The method of claim 1, wherein the step of using the photo/text types of the pixel blocks to determine an output type of the original image includes the step of setting a type threshold to determine the output type of the original image.

11. The method of claim 1, wherein the output types include at least a halftone output type and a non-halftone output type.

* * * * *